United States Patent [19]

Simonton

[11] 4,280,865
[45] Jul. 28, 1981

[54] SYNCHRONIZED DRIVE FOR HEAT SEALING ROLLER ANVILS

[75] Inventor: Robert D. Simonton, Fremont, Ohio

[73] Assignee: Dale Products, Inc., Fremont, Ohio

[21] Appl. No.: 69,620

[22] Filed: Aug. 27, 1979

[51] Int. Cl.³ .................. B30B 15/30; B32B 31/20
[52] U.S. Cl. .................. 156/538; 156/555; 156/580.1; 156/583.1; 156/583.5
[58] Field of Search ............ 156/580.1, 582, 583.1, 156/538, 555, 583.5, 73.1, 290; 100/93 RP; 228/1 R

[56] References Cited

U.S. PATENT DOCUMENTS

| | | | |
|---|---|---|---|
| 2,117,452 | 5/1938 | Robinson | 156/582 |
| 3,737,361 | 6/1973 | Obeda | 156/580.1 |
| 3,808,080 | 4/1974 | Parry | 156/580.1 |
| 3,840,420 | 10/1974 | Sarcia | 156/583.1 |
| 4,164,833 | 8/1979 | Todd | 156/583.1 |

Primary Examiner—Michael G. Wityshyn
Attorney, Agent, or Firm—Wilson, Fraser, Barker & Clemens

[57] ABSTRACT

This invention relates to a mechanism for effecting the synchronized rotation of a rotary anvil employed in a heat sealing operation on thermoplastic sheet material with the linear movement of the thermoplastic sheet moving under the rotating anvil. One specific application of the invention is the heat sealing of the lateral edges of a thermoplastic sheet wrapped around a battery plate. The linear movement of the mechanism carrying the wrapped battery plate is utilized to rotate the rotary heat sealing anvil in exact synchronism with the movement of the wrapped battery plate beneath the anvil.

5 Claims, 2 Drawing Figures

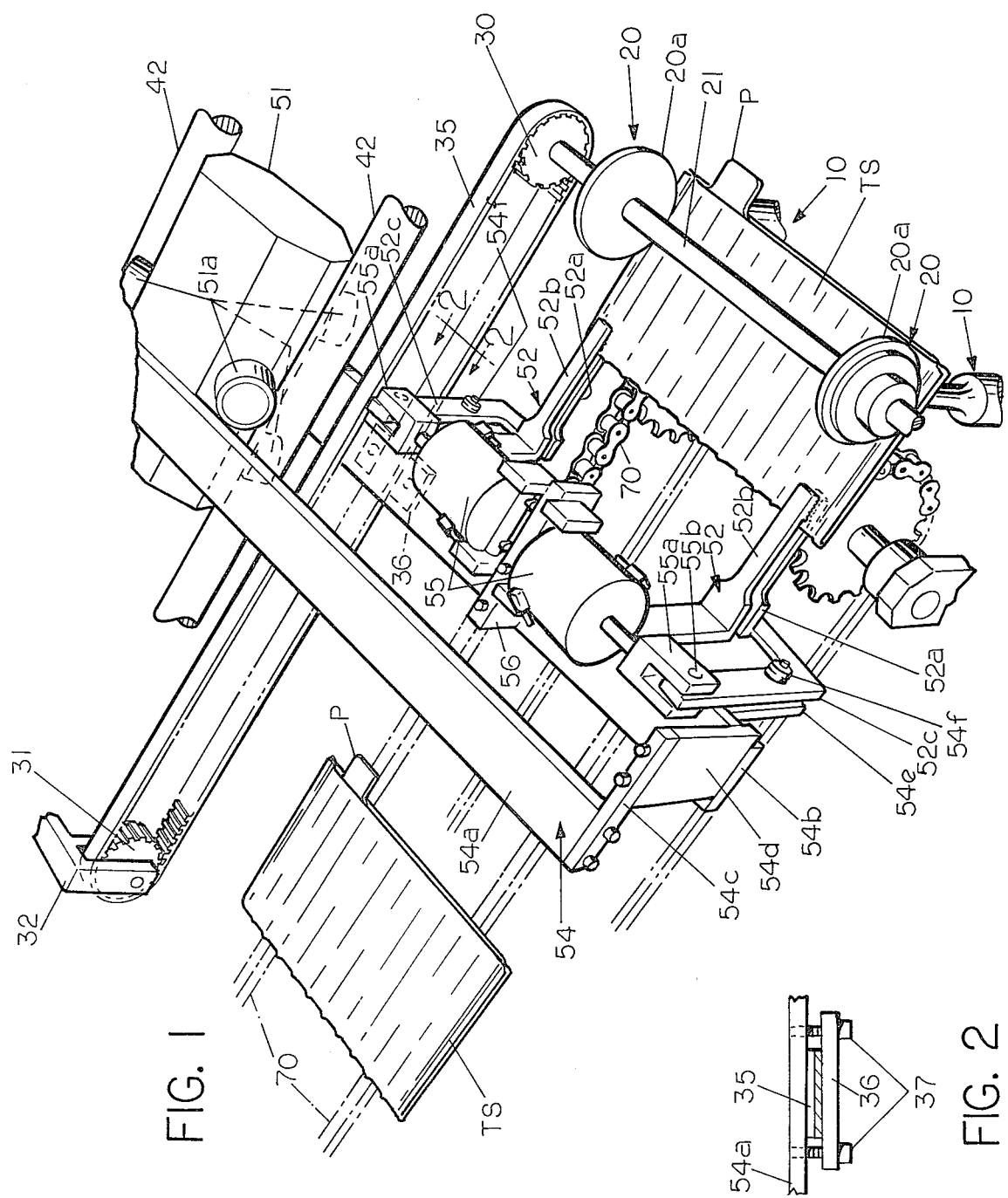

SYNCHRONIZED DRIVE FOR HEAT SEALING ROLLER ANVILS

BACKGROUND OF THE INVENTION

The heat sealing of over-lapping sheets of thermoplastic material has been accomplished in the prior art by a large number of machines. Certain of such machines require one side of the thermoplastic article sealed to be contacted by an anvil member which functions not only to position the thermoplastic sheet material to be sealed, but also acts as a reflector of either thermal, light or acoustic energy generated by suitable source thereof to effect the heating of the thermoplastic sheet material to the fusion point in order to effect the heat sealing thereof.

The co-pending application of Carl Schroder, Ser. No. 967,379, filed Dec. 7, 1978 and assigned to the assignee of this application, discloses a battery plate wrapping machine wherein successive battery plates are enclosed within a sheet of thermoplastic material and the over-lapped lateral edges of such sheet are sealed by acoustic guns. Opposite the discharge end of such guns, a roller anvil is positioned so as to hold the overlapped edges of the thermoplastic sheet in position for sealing and to also provide a reflection surface for directing the acoustic energy generated by the acoustic gun into the thermoplastic material. Such roller anvils were merely mounted for free rotation and were moved by the frictional engagement of the thermoplastic sheet with the anvil surfaces as the wrapped plate moved linearly past the heat energy source.

It has been my observation that the friction induced rotation of the anvils often effected an undesired displacement or wrinkling of the over-lapped edges of the thermoplastic sheets, thus resulting in an improper heat seal and a potentially defective wrap for the battery plate enclosed between the thermoplastic sheet. It was my further observation that this defective performance of existing heat sealing mechanisms employing roller anvils could be completely overcome if the roller anvil were rotated by a separate power source in exact synchronism with the linear movement of the thermoplastic sheet material contacted by the anvil so that there is no relative movement between such sheet material and the cylindrical surface of the roller anvil.

SUMMARY OF THE INVENTION

This invention provides a simple, economical driving mechanism for a roller anvil of a heat sealing mechanism which effects the synchronized movement of the surface of the roller anvil with the linear movement of thermoplastic sheet material passed between the anvil and a source of sealing energy. A pinion is secured to the shaft on which the roller anvil is mounted. The pinion is in turn driven by a chain or timing belt. The chain or timing belt is clamped to a reciprocating machine element that produces the reciprocating movement of a feeding mechanism which carries a thermoplastic sheet material to be heat sealed into and through the gap defined between the roller anvil and the source of heat sealing energy. It is thereby assured that the roller anvil is rotated only when the thermoplastic sheet feeding mechanism is moving and, more importantly, the rotational movment of the roller anvil is exactly synchronized with the linear movement of the feeding mechanism so that the cylindrical surface of the roller anvil is moving at exactly the same linear speed as the thermoplastic sheet material carried by the feeding mechanism.

Further objects and advantages of the invention will be readily apparent to those skilled in the art from the following detailed description of a preferred embodiment thereof, taken in conjunction with the annexed sheet of drawings.

BRIEF DESCRIPTION OF DRAWINGS

FIG. 1 represents a schematic perspective view of a heat sealing mechanism employing roller anvils for effecting the sealing of the over-lapping edges of a thermoplastic sheet wrapped around a battery plate.

FIG. 2 is a partial sectional view taken on the plane 2—2 of FIG. 1.

DESCRIPTION OF PREFERRED EMBODIMENT

The mechanism illustrated in the drawing constitutes only the heat sealing portion of a complete machine designed to insert a battery plate P within a folded sheet of thermoplastic separator material TS and convert the folded sheet into a pouch by heat sealing the over-lapping lateral edges of the sheet TS through the application of thermal energy respectively supplied from thermal energy sources 10. The complete machine is described and illustrated in the aforementioned co-pending application of Carl Schroder, Ser. No. 967,379 filed Dec. 7, 1978 and assigned to the assignee of this application, and reference should be had to such co-pending application for a description of the complete battery plate wrapping machine.

Each thermal energy source 10 may comprise an ultra high frequency acoustic generator, an infra-red heater, or a laser beam generator, but in any event the energy produced by such source is directed into the over-lapping edges of the thermoplastic sheet TS. To maintain such edges in the desired position relative to energy source 10 and to each other, a roller anvil 20 is provided which is mounted for rotation on a shaft 21 suitably journalled in the machine structure so that the cylindrical surface 20a of the roller anvil 20 rides on the top surface of the thermoplastic sheet TS at a position immediately above the area of impact of the acoustic or other form of thermal energy generated by the thermal energy source 10. Thus, two such roller anvils 20 are provided in axially spaced relationship on the shaft 21 to respectively engage the two lateral edges of sheets TS. The wrapped battery plate P is pulled through the heat sealing gap or zone defined between each roller anvil 20 and its cooperating thermal energy source 10 by a pair of gripping tongs 52 which are respectively mounted in laterally spaced relationship on a shuttle frame 54. Shuttle frame 54 is defined by a pair of parallel but offset bars 54a and 54b having their one ends respectively secured to the top and bottom surfaces of a reciprocating carriage 51 by suitable bolts and their outboard ends secured together by a vertical plate 54d and a longitudinally extending bar 54c.

Carriage 51 is of generally hexagonally shaped configuration and has mounted thereon a plurality of rollers 51a which cooperate with a pair of parallel guide bars 42. Carriage 51 is shuttled back and forth along guide bars 42 by a suitable hydraulic cylinder (not shown) hence the plate grippers 52 are reciprocated toward and away from the heat sealing roller anvils 20 in timed relationship to the appearance of a sheet enclosed battery plate P at the heat sealing station.

Each gripping mechanism 52 includes a stationary upper gripping member 52b and a movable lower member 52a. A pair of pivot mounting brackets 54e are respectively secured in depending relationship to the bottom frame bar 54a on opposite sides of the path of a wrapped plate chain conveyor 70. In the lower end of each depending bracket 54e, a horizontally disposed pivot pin 54f is suitably mounted and provides a pivotal mounting for the movable element 52a of the gripping mechanism 52. The stationary gripping member 52b is of L-shaped configuration and the top portion of such member is suitably secured in depending relationship to the frame bar 54. The movable tong element 52a is secured to the end of an L-shaped mounting arm 52c which is medially mounted on the pivot pin 54f. Pivotal movements of the L-shaped member 52c about pivot mounting pin 54 will produce a lateral and upward displacement of the grasping portion of the movable tong 52a from an open position (not shown), where it is completely out of the path of a wrapped plate WP supported on the conveyor 70, to a closed position, as shown on the drawings, wherein it is grasping the leading portions of the sheet enfolded plate P as it emerges from a folding notch or aperture (not shown). In this position, it will be noted that both grasping members 52 lie laterally inboard of the positions of the heat sealing energy sources 10.

Each movable member 52a is actuated by a double acting fluid cylinder 55 which is suitable mounted in a frame structure 56 which is bolted to the bottom frame bar 51a. The output clevis 55a of each fluid cylinder 55 is connected to the top end of the L-shaped actuating link 52c by a suitable pivot pin 55b.

The application of pressured fluid to cylinders 55 is controlled by conventional valves (now shown) which are actuated in timed relationship to the position of the plate grasping carriage 51. The timing sequence is such that as the wrapped plate carriage 51 moves to the right as viewed in the drawing, the tong-like plate grasping mechanisms 52 are held in their open position by cylinders 55. Cylinders 55 are actuated to close the grasping tongs 52 when such tongs reach a position immediately adjacent the output side of a folding aperture (not shown) by which the thermoplastic sheet TS is wrapped around a battery plate P which is proceeding through such folding aperture and remain in their closed position through the entire extraction stroke until just prior to reaching the extreme end of the extraction stroke, at which point they are opened by cylinders 55 and the wrapped battery plate P drops a very slight distance to rest on the top surface of the wrapped plate conveyor 70 and is moved to the left away from the sealing apparatus. It is therefore apparent that all during the passage of the wrapped plate through the heat sealing mechanism, the enfolding separator sheet and the battery plate are rigidly clamped by the grasping tongs 52 to maintain the desired accurate alignment of the separator sheet relative to the enclosed battery plate. The tongs 52, frame 54 and carriage 51 thus constitute a means for conveying the thermoplastic sheet material to be sealed through the heating zone.

In accordance with this invention, the heat sealing anvils 20 are rotated in exact synchronism with the linear movement of the wrapped plate P through the sealing station. In other words, the rollers are rotated at a speed such that the linear speed of the roller surface 20a at the point that it contacts the top surface of the separator sheet TS is exactly equal to the linear speed of the sheet. This insures that the thermoplastic sheet material will not be bulged, wrinkled or shifted in position by any drag imposed by the heat sealing rollers.

Such synchronized rotary movement is conveniently imparted to the shaft 21 carrying the heat sealing anvil rollers 20 by a sprocket 30 which is secured to the inboard end of shaft 21 and is engaged by a chain or timing belt 35. The other end of the timing belt 35 is trained over an idler sprocket 31 which is suitably journalled on a frame element 32 of the machine. The lower flight of the timing belt 35 is then rigidly clamped to any conveniently adjacent portion of the reciprocating plate extraction frame 54 or carriage 51. For example, a plate 36 (FIG. 2) may be secured to the bottom frame bar 54a of the shuttle frame 54 by a pair of bolts 37 with the belt 35 clamped therebetween. In this manner it is assured that when the plate grippers 52 are initially brought into engagement with the leading edge of the sheet enfolded battery plate, and then moved to the left to pull the lateral edges of the enfolding sheet TS past the heat sealing energy sources 10, the shaft 21, and hence the anvil rollers 20, will be rotated at a synchronized speed with respect to such linear movement of the plate grasping mechanism 52. Thus, the peripheral surfaces 20a of the roller anvils 20 engaging the top surface of the plastic sheet TS, will be moving at exactly the same linear speed as the sheet and hence will hold both sheet portions in proper position with respect to the energy sources 10 so that a heat seal is effected between the overlapped lateral edges of the plastic sheet without in any manner disturbing the position of the sheet relative to the enclosed battery plate P.

Modification of this invention will be readily apparent to those skilled in the art and it is intended that the scope of the invention be determined solely by the appended claims.

I claim:

1. In a mechanism for heat sealing overlapping portions of thermoplastic sheet material having a thermal energy source producing a heating zone and linearly movable gripping means for positively linearly moving the thermoplastic sheet material through the heating zone, the improvement comprising a roller anvil, means mounting said roller anvil for rotation at a position in said heating zone to engage the surface of the thermoplastic sheet material opposite to the thermal energy source, and means movable with said gripping means for positively rotating said roller and to move the peripheral surface thereof in exact speed synchronism with the linear movement of said thermoplastic sheet material through the heating zone.

2. The improvement defined in claim 1 wherein said last mentioned means comprises a chain drive connection between said roller anvil and said linearly movable gripping means for linearly moving the thermoplastic sheet material through the heating zone.

3. In a mechanism for heat sealing the over-lapping lateral edge portions of a thermoplastic sheet wrapped around battery plate, said mechanism including a pair of thermal energy sources respectively producing heating zones spaced apart by a distance corresponding to the lateral spacing of said over-lapping edge portions of the thermoplastic sheet, and linearly movable gripping means for linearly moving the sheet enclosed battery plate through the two heating zones, the improvement comprising a pair of roller anvils, means for respectively mounting said roller anvils for rotation at a position in said heating zones to engage the surface of the thermoplastic sheet opposite to the thermal energy source, and means movable with said gripping means for positively rotating said roller anvils to move the peripheral surfaces thereof in an exact speed synchronism with the linear movement of said thermoplastic sheet through the heating zones.

4. The improvement defined in claim 3 wherein said last mentioned means comprises a chain drive connection between said roller anvils and said linearly movable gripping means for linearly moving the sheet enclosed battery plate through the heating zones.

5. In a mechanism for heat sealing the over-lapping lateral edge portions of a thermoplastic sheet wrapped around a battery plate, said mechanism including a pair of thermal energy sources respectively producing heating zones laterally spaced to correspond to the positions of said over-lapped lateral edges of the thermoplastic sheet, and a gripping mechanism for engaging the sheet enclosed battery plate and linearly moving same through the heating zones, the improvement comprising a pair of roller anvils, a shaft mounting said roller anvils for rotation at positions in said heating zone to respectively engage the lateral surfaces of the folded thermoplastic sheet opposite to the thermal energy sources, a pinion on said shaft, a chain drive engaging said pinion, said chain drive having one flight thereof disposed in generally parallel relationship to the linear movement of said gripping mechanism, and means for clamping said flight of said driving chain to said gripping mechanism to cause said driving chain to move synchronously therewith, thereby imparting rotation to said anvils to move the peripheral surfaces thereof in exact synchronism with the linear movement of said thermoplastic sheet surfaces through the heating zones.

* * * * *